(12) United States Patent
Schober et al.

(10) Patent No.: US 12,523,731 B2
(45) Date of Patent: Jan. 13, 2026

(54) ANGLE-OF-ARRIVAL ESTIMATION METHOD FOR ARBITRARY ANTENNA SPACINGS AND CORRESPONDING COMMUNICATION DEVICE

(71) Applicant: NXP B.V., Eindhoven (NL)

(72) Inventors: Michael Schober, Graz (AT); Pablo Corbalán Pelegrín, Callosa de Segura (ES); Ghiath Al-kadi, Graz (AT)

(73) Assignee: NXP B.V., Eindhoven (NL)

( * ) Notice: Subject to any disclaimer, the term of this patent is extended or adjusted under 35 U.S.C. 154(b) by 464 days.

(21) Appl. No.: 18/170,934

(22) Filed: Feb. 17, 2023

(65) Prior Publication Data

US 2023/0266422 A1    Aug. 24, 2023

(30) Foreign Application Priority Data

Feb. 23, 2022  (EP) ...................................... 22158254

(51) Int. Cl.
*G01S 3/48* (2006.01)
*H04W 64/00* (2009.01)

(52) U.S. Cl.
CPC ............. *G01S 3/48* (2013.01); *H04W 64/003* (2013.01)

(58) Field of Classification Search
CPC ................................ H04W 64/003; G01S 3/48
See application file for complete search history.

(56) References Cited

U.S. PATENT DOCUMENTS

| | | | |
|---|---|---|---|
| 10,094,902 B2 | 10/2018 | Marquez et al. | |
| 2016/0242135 A1* | 8/2016 | McLaughlin | H04B 1/71637 |
| 2017/0242092 A1* | 8/2017 | Marquez | G01S 3/46 |
| 2018/0038935 A1 | 2/2018 | Iizuka et al. | |
| 2022/0390541 A1* | 12/2022 | Chen | G01S 5/04 |

FOREIGN PATENT DOCUMENTS

WO    2021/261818 A1    12/2021

OTHER PUBLICATIONS

Dotlic, Igor et al.; "Angle of Arrival Estimation Using Decawave DW1000 Integrated Circuits"; 2017 14th Workshop on Positioning, Navigation and Communications (WPNC); Oct. 25-26, 2017, Bremen, Germany; DOI: 10.1109/WPNC.2017.8250079.

(Continued)

*Primary Examiner* — Justin Y Lee (57) ABSTRACT

A method for determining an angle of arrival at a communication device is described. The method comprises performing a message exchange between the communication device and a further communication device. The message exchange comprises receiving at least one first message associated with a first frequency at the communication device by means of a first antenna and a second antenna and receiving at least one second message associated with a second frequency at the communication device by means of the first antenna and the second antenna. The method further comprises determining the angle of arrival defined by an orientation of the communication device and a transmission direction of the message exchange, wherein the angle of arrival is determined based on the received first message and the received second message. Furthermore, a corresponding communication device is described.

19 Claims, 5 Drawing Sheets

(56) References Cited

OTHER PUBLICATIONS

Safi, Alamgir et al.; "Ambiguity Resolution in Direction of Arrival Estimation with Linear Antenna Arrays Using Differential Geometry"; Tech Science Press; Computers, Materials & Continua; vol. 70, No. 1; 2022; DOI: 10.32604/cmc.2022.018963.

U.S. Appl. No. 17/453,594; Inventor Michael Schober, et al.; "Method for Angle of Arrival Estimation in an Impulse-Radio Ultra-Wideband Communications System," filed Nov. 4, 2021.

* cited by examiner

ANGLE-OF-ARRIVAL ESTIMATION METHOD FOR ARBITRARY ANTENNA SPACINGS AND CORRESPONDING COMMUNICATION DEVICE

CROSS-REFERENCE TO RELATED APPLICATIONS

This application claims priority under 35 U.S.C. § 119 to European Patent Application No. 22158254.7, filed on Feb. 23, 2022, the contents of which are incorporated by reference herein.

TECHNICAL FIELD

The present disclosure relates to a method for determining an angle of arrival at a communication device. The disclosure further relates to a corresponding communication device. In this context, the present disclosure may refer to the technical field of radio frequency communication.

TECHNICAL BACKGROUND

Radio frequency (RF) ranging systems can be used for measuring the distance, the position and the direction between objects, for example between a mobile phone and a tag. Recently, UWB radio technology has been increasingly employed for these tasks. The large bandwidth of this technology enables accurate distance, position, and direction estimation with time-based and angle-based measurements. Angle of arrival (AoA) estimation is particularly important for the success of UWB in today's market. AoA estimates can be used for direction finding, localization, and even remote control of many smart gadgets.

To measure the angle of arrival (AoA) of a signal, UWB and other RF systems exploit the phase-difference of arrival (PDoA) of the signal at two or more antennas. To avoid ambiguities, these antennas need to be separated by less than half the wavelength of the frequency carrier. However, this is not always possible, e.g., in UWB or other RF devices with hard space constraints like smartphones. Increasing the spacing between the antennas results in PDoA ambiguities where multiple AoA values can be mapped to a single PDoA, largely increasing the error in AoA estimation.

It has been suggested to address the above-described ambiguities by using time-difference of arrival (TDoA) estimates but TDoA values show a much larger variance than desired, which in turn leads to large AoA errors.

OBJECT AND SUMMARY OF THE DISCLOSURE

An object of the present disclosure is to facilitate accurate and reliable determination of an angle of arrival at a communication device.

In order to achieve this object, a method and a device according to the independent claims are provided.

According to an aspect of the present disclosure, a method for determining an angle, in particular an angle of arrival, at a communication device is described. The method comprises (a) performing a message exchange between the communication device and a further communication device. The message exchange comprises (a1) receiving at least one first message associated with a first frequency at the communication device by means of a first antenna and a second antenna and (a2) receiving at least one second message associated with a second frequency at the communication device by means of the first antenna and the second antenna. The method further comprises (b) determining the angle defined by an orientation of the communication device and a transmission direction of the message exchange, wherein the angle is determined based on the received first message and the received second message.

According to a further aspect of the present disclosure, a communication device, in particular a UWB communication device, is described. The communication device comprises (a) a transceiver unit comprising a first antenna and a second antenna, wherein the transceiver unit is configured to perform a message exchange between the communication device and a further communication device. The message exchange comprises (i) receiving at least one first message associated with a first frequency at the communication device by means of the first antenna and the second antenna and (ii) receiving at least one second message associated with a second frequency at the communication device by means of the first antenna and the second antenna. The communication device further comprises (b) a processing unit configured to determine an angle, in particular an angle of arrival, defined by an orientation of the communication device and a transmission direction of the message exchange, wherein the angle is determined based on the received first message and the received second message.

In the context of the present disclosure, the term "communication device" may refer to a device that is capable of exchanging information with other devices such as a further communication device. The information may be exchanged via radio frequency (RF) signals, in particular ultra-wide band (UWB) signals. Accordingly, the communication device may be a UWB communication device. The communication device may be a mobile device, a mobile phone, a transceiver, a circuit, a tag, a key, a token or a smartcard, in particular with UWB or other RF functionality.

For exchanging information, the communication device is equipped with the first and the second antenna. It may be equipped with a third antenna or even more than three antennas. These antennas may be capable of receiving and/or sending signals, in particular RF signals such as UWB signals. Thus, the antennas may be UWB antennas. The first and second antennas may form part of a "transceiver unit" of the communication device. The transceiver unit may include circuitry for measuring and/or analyzing signals received by the antennas, e.g. to determine a message associated with a signal. The transceiver unit may be a receiver unit configured only to receive signals, but not to send signals.

The communication device may further include a "processing unit", which may be configured to analyze received signals and/or received messages. The processing unit may be configured to determine information encoded in the received signals, e.g. determine a message encoded in the received signal. It may be configured to determine certain characteristics of the received signals and/or received messages, for example a phase, a frequency, a wavelength or a magnitude. The processing unit may comprise processing circuitry. It may comprise electronic circuitry that executes instructions such as a computer program. It may further comprise a memory and/or input/output circuitry.

The "further communication device" may, but need not have the characteristics of the above-described communication device. It may share only some characteristics with the communication device. For example, the further communication device may have only a single antenna. Thus, it may not be capable of determining an angle of arrival by the above-described method. It may have two or more than two antennas.

In the context of the present disclosure, a "message" may refer to information carried by a corresponding signal. The information may be encoded in the signal, for example in terms of a modulated carrier signal, which may be frequency-modulated, amplitude-modulated and/or phase-modulated. Alternatively, the information may be encoded in terms of carrierless modulation. In an embodiment, a message may directly refer to a physical signal such as an RF signal, in particular a UWB signal. The message may refer to both a signal carrying information and the information. The information may consist of or include physical characteristics of the signal such as a phase of an associated frequency, e.g. at a rising edge and/or first path of the signal. The part of the signal used for AoA estimation may be a preamble signal and/or a STS sequence corresponding to a sequence of single pulses.

The message may be a beacon message, a final beacon message, a prepoll message, a poll message, a final message or a final data message. The at least one first message may be a single first message or may be a plurality of first messages, e.g. two, three, four, five or more messages. Similarly, the at least one second message may be a single second message or may be a plurality of second messages, e.g. two, three, four, five or more messages.

When a message is "associated" with a frequency, this may refer to the corresponding physical signal being associated with the frequency. For example, the frequency may be a carrier frequency of the signal and/or it may relate to a frequency range associated with the signal, e.g., the frequency range of a communication channel or of a frequency band. It may denote a lower or upper boundary of that frequency range. It may also relate to a frequency used for carrierless modulation. The first frequency may be different from the second frequency.

The term "message exchange" may refer to an information exchange between a communication device and a further communication device. In such a message exchange, messages may be sent and/or received at the communication device and/or sent and/or received at the further communication device. The information exchange can be, but need not be mutual, i.e. messages may be exchanged only in one direction, e.g. from the communication device to the further communication device or from the further communication device to the communication device. The message exchange may comprise further messages associated with the first frequency and sent from the communication device and/or further messages associated with the second frequency and sent from the communication device. The message exchange may follow a given communication protocol such as a UWB message exchange protocol.

In the context of the present disclosure, the "angle of arrival" is defined by an orientation of the communication device and a transmission direction of the message exchange. The angle of arrival may be specified in terms of an azimuth and an elevation of the incoming or received signal. The angle of arrival may be defined as the angle between the transmission direction and an antenna axis.

The "orientation" of the communication device may be defined by the orientation of the first and/or second antennas of the communication device, in particular one or more axes of those antennas. An antenna axis may for example be perpendicular to the plane, in which maximum power is radiated by the antenna. The orientation of the communication device may refer to an axis of the communication device, e.g. along the width, length or height of the communication device.

The "transmission direction" of the message exchange may refer to a direction of propagation of corresponding signals implementing the message exchange. It may refer to the direction of propagation of a wave or wavefront incident on the first and/or second antenna, in particular of an electromagnetic wave such as a radio-frequency wave or a UWB wave. The transmission direction may be defined by a direction from the further communication device to the communication device or vice versa.

According to an exemplary embodiment, the present disclosure may be based on the idea to facilitate accurate and reliable determination of an angle of arrival at a communication device. The above-described method and device may be particularly advantageous in situations when ambiguities in the determined angle of arrival arise. For example, such ambiguities may occur, when the antenna spacing between the first and second antenna is larger than or at least as large as a certain threshold. The threshold may be related to the first and/or second frequencies. For example, the threshold may correspond to half a first wavelength corresponding to the first frequency or half a second wavelength corresponding to the second frequency.

The above-described method and corresponding device may allow eliminating at least some of these ambiguities, in particular all of them. Thus, the angle of arrival may be determined accurately. Conventionally, attempts have been made to eliminate ambiguities in the angle of arrival by also determining the time difference of arrival. However, values of this time difference of arrival may show a large variance leading to larger errors in the angle of arrival compared with a method in which messages associated with two or more frequencies are used to determine the angle of arrival.

The above-described method and corresponding device may be advantageous, because ambiguities in determining the angle of arrival may be eliminated or at least reduced without the need of adding further hardware such as additional antennas. By allowing arbitrary distances between antennas while tackling the problem of the mentioned ambiguities, antenna placement in communication devices, such as UWB-equipped devices, is facilitated. This may be especially useful in devices with strict space constraints like smartphones leading to a higher degree of freedom in antenna placement and system design without increasing manufacturing costs.

DESCRIPTION OF EXEMPLARY EMBODIMENTS

In the following, further exemplary embodiments of the method and the device will be explained.

According to an embodiment, the angle is determined based on a first phase difference resulting when the first message is received by means of the first antenna and the second antenna and on a second phase difference resulting when the second message is received by means of the first antenna and the second antenna.

The first phase difference may result from a propagation delay, when the first message associated with the first frequency or a corresponding signal is received at the first antenna and at the second antenna. Similarly, the second phase difference may result from a propagation delay, when the second message associated with the second frequency or a corresponding signal is received at the first antenna and at the second antenna. The propagation delay may correspond to the distance between the two antennas multiplied by the sine of the angle of arrival. Accordingly, the respective phase differences may correspond to the distance between the two antennas multiplied by the sine of the angle of arrival and by the frequency associated with the message or corresponding signal divided by a propagation speed associated with the message or corresponding signal, e.g. the speed of light. The phase differences may be differences in the carrier phase of the respective signal at the two antennas. The phase differences may be measured at a rising edge of the signal. They may be measured with respect to the first path of the signal, which may correspond to a line of sight between a source of the signal and the antennas.

The above-described embodiment specifies a procedure to determine an angle of arrival, namely by measuring phase differences, when a message or corresponding signal is received at two antennas arranged with a predetermined distance. When this distance is larger than half a wavelength associated with the message, ambiguities may arise because of the periodicity of corresponding frequency signals such as carrier signals. Because these ambiguities typically differ for different frequencies, at least some of them may be avoided by determining two phase differences associated with different frequencies.

According to a further exemplary embodiment, the communication device, in particular the transceiver unit, comprises one or more further antennas, e.g. a third antenna. Determining the angle of arrival based on phase differences also with respect to these further antennas may increase the accuracy of the determined angle of arrival, e.g. at the first and third antennas and/or the second and third antennas. It may also be possible to determine a further angle of arrival using the third antenna in combination with the first antenna and/or the second antenna. Thus, there might be three receivers associated to three antennas. In general, depending on the number of receivers, two or more antennas may be used to receive each message. A three-antenna setup, e.g. in an L-shape, may be deployed. Two of the antennas may be used to estimate a horizontal AoA (from a horizontal PDoA measured at the two horizontal antennas) and a different antenna pair (potentially reusing one antenna) is used as a vertical antenna pair to estimate a vertical AoA (from a vertical PDoA). Furthermore, a system may use more than two antennas for the horizontal pair, e.g., to improve accuracy.

According to a further embodiment, a distance between the first antenna and the second antenna is at least half a first wavelength corresponding to the first frequency. Alternatively or in addition, it may be at least half a second wavelength corresponding to the second frequency. It may be at least half the minimum of the first and second wavelengths. It may be at least half the maximum of the first and second wavelengths. In all of these cases, it may also be strictly larger.

The first wavelength may equal a propagation speed (associated with the first message or a corresponding signal, e.g. the speed of light) divided by the first frequency. The second wavelength may equal a propagation speed (associated with the second message or a corresponding signal, e.g. the speed of light) divided by the second frequency. The first and second frequencies may be carrier frequencies associated with the respective messages or signals. The propagation speed of the signal may be the speed of light in the medium in which the signal travels, e.g. air. The first and second frequencies may be respective carrier frequencies.

The above embodiment may be advantageous because antenna placement may be facilitated in particular in communication devices with strict space requirements such as smart phones. In such devices it may not always be possible to arrange two antennas at a distance of half a first wavelength and/or second wavelength or smaller. As mentioned, placing antennas at larger distances may result in ambiguities which are addressed as described.

According to a further embodiment, the first frequency is associated with a first frequency channel and the second frequency is associated with a second frequency channel different from the first frequency channel.

Over the first frequency channel, the first message associated with the first frequency may be transmitted. Over the second frequency channel, the second message associated with the second frequency may be transmitted. The first frequency may be a carrier frequency of the first frequency channel. The second frequency may be a carrier frequency of the second frequency channel. The first and second frequencies may be otherwise related to the respective frequency channels, e.g. denoting an upper or lower boundary.

Transmitting the messages over different frequency channels may be advantageous to distinguish the first and second frequencies and to ensure that the respective phase differences are sufficiently different to resolve ambiguities.

According to a further exemplary embodiment, the first message is transmitted over the first frequency channel and the second message is transmitted over the second frequency channel.

According to a further embodiment, the first frequency channel and/or the second frequency channel are ultra-wide band, UWB, frequency channels. Using UWB channels may be advantageous since UWB technology has recently been used for determining angles of arrival. In particular, the large bandwidth of UWB radio technology has been shown to be particularly effective for accurate angle of arrival measurements.

For example, the first UWB frequency channel may be channel 5 and the second UWB frequency channel may be channel 9 (e.g. defined by the IEEE 802.15.4 standard), or vice versa. This may be advantageous because of the substantial difference between respective carrier frequencies. Also, these channels may be wideband channels, which are available in many parts of the world. Alternatively, channels 9 and 10 or channels 9 and 12 may be used with similar advantages.

According to a further embodiment, a third frequency channel is between the first frequency channel and the second frequency channel. At least two, three, four, five or more frequency channels may be between the first and second frequency channels. This may be advantageous to ensure a sufficiently large difference between the respective phase differences to resolve ambiguities when determining angles of arrival.

According to a further embodiment, the at least one second message is received after or before the at least one first message. For example, a single second message may be received after or before a plurality of first messages. Such an embodiment may be advantageous in order to avoid excessive switching between different frequencies and/or channels related to those frequencies. It may be advantageous to avoid multichannel ranging, which may not be possible.

According to a further embodiment, the method further comprises determining a distance between the communication device and the further communication device based on the at least one first message, in particular in combination with further messages associated with the first frequency and sent from the communication device. The distance may be determined based exclusively on the at least one first message in combination with the further messages. Alternatively, the at least one second message may also be used for determining the distance, in particular in combination with the at least one first message and the further messages. Thus, the at least one first message, potentially in combination with further messages associated with the first frequency and sent from the communication device to the further communication device, may form part of or constitute a ranging message exchange, in particular for determining a distance between the communication device and the further communication device. This may be a conventional ranging message exchange, which may be widely used, and/or a standardized message exchange established by a standardization agency such as the FiRa Consortium. For example, the ranging message exchange may be an advertisement message exchange, a double-sided two-way ranging (DS-TWR) message exchange, a single-sided two-way ranging (SS-TWR) message exchange or a FiRa-compliant double-sided two-way ranging (FiRa DS-TWR) message exchange. Such an embodiment may be advantageous for determining a relative position between communication device and further communication device since both distance and angle between them are determined.

According to a further embodiment, frequency circuitry, in particular a phase-locked loop (PLL), of the further communication device is configured for providing a time source and for providing at least one of the first frequency and the second frequency, in particular both. The frequency circuitry may be the only time source of the further communication device. Alternatively or in addition, the communication device may have the same or similar frequency circuitry. This embodiment may be advantageous because it allows for an efficient but inexpensive setup of the further communication device. Changing the frequency, e.g. from first to second frequency or vice versa, may negatively affect the accuracy of the time source. This may in turn render distance measurements less exact. Therefore, the embodiment may be particularly advantageous, if the frequency and/or a corresponding frequency channel is not changed during ranging or distance measurement.

According to a further embodiment, the message exchange comprises or consists of a standardized message exchange, in particular a standardized ranging message exchange, in particular one of an advertisement message exchange, a DS-TWR message exchange, an SS-TWR message exchange, and a FiRa DS-TWR message exchange. The standardized message exchange may be a widely used message exchange and/or a message exchange established by a standardization organization. The standardized message exchange may comprise or consist of the at least one first message, potentially in combination with further messages associated with the first frequency and sent from the communication device. The standardized ranging message exchange may be configured for determining a distance between the communication device and the further communication device. Alternatively or in addition, the message exchange may comprise other standardized message exchanges used for purposes other than ranging. Accordingly, the at least one first message, potentially in combination with the at least one second message, may serve purposes other than ranging.

According to a further embodiment, the at least one second message is separate from the standardized ranging message exchange. The at least one second message may be or comprise a final beacon message. For example, if the standardized ranging message exchange is a DS-TWR message exchange, the at least one second message may be or comprise a final beacon sent from the further communication device to the communication device, e.g. over a frequency channel associated with the second frequency. This may be advantageous for keeping apart the tasks of ranging or distance determination and of angle-of-arrival determination. The embodiment may also be advantageous, because at least in certain situations ranging based on different frequencies such as multi-channel ranging may not be possible.

According to a further embodiment, a frequency associated with a standardized message of the standardized ranging message exchange is changed from the first frequency to the second frequency, in particular such that the standardized message forms the second message or at least part of the at least one second message. The standardized message may be a message at the beginning or end of the ranging message exchange. It may be a message sent, when the distance determination has not yet started or has already ended, so that the change in frequency does not interfere with the distance determination. It may for example be a prepoll message or a final data message. Such an embodiment may be advantageous because it may reduce the overall number of messages sent and/or the channel utilization.

According to a further embodiment, the second message comprises at least one of the following or consists of one of the following: a beacon message, a final beacon message, an initial beacon message, a prepoll message and a final data message. The terms "initial" and "final" may refer to an order or position within the entire message exchange or within a ranging message exchange forming part of the message exchange. The listed types of messages may be particularly simple to add or it may be particularly simple to change their associated frequencies without adverse effects. For example, a final beacon message may be particularly simple to add, after a ranging message exchange has been performed. It may be possible to change the associated frequency of a prepoll message or of a final data message forming part of a ranging message exchange without affecting the distance determination.

According to a further embodiment, the angle of arrival is determined using a machine learning model, which is adapted to the first antenna and the second antenna. The machine learning model may be adapted to specific characteristics of the first and second antennas, e.g. their relative position, their relative orientation and/or their radiation properties. The machine learning model may be built based on training data correlating measured phase differences, in particular first and second phase differences, with measured angles, in particular angles of arrival.

In the case of 3D AoA estimation using two antenna pairs, one for a horizontal angle and one for a vertical angle, the algorithm may be trained on data correlating 3D angles. This may be advantageous, if there is a certain impact of the elevation angle in the PDoA related to the horizontal angle and vice versa.

The machine learning model may be established by a machine learning method. The machine learning method may comprise (i) collecting training data, which may correlate measured and/or simulated phase differences with corresponding measured and/or simulated angles of arrivals, (ii) training a model, in particular a machine learning model such as a neural network, a decision tree, or a random forest, based on the training data, (iii) determining the angle of arrival based on the first phase difference and the second phase difference using the model. The model may be a look-up table summarizing the collected training data. Alternatively or in addition to a machine learning method, iterative methods or an analytic solution may be used.

Using a machine learning method to determine the angle of arrival may be advantageous because such an approach may account for specifics of the communication device and/or the further communication device, which may not easily be determined analytically. It may be easily adaptable to specific setups, in particular antenna setups. It may thus render the determination of the angle of arrival more exact. Also, an analytic solution may not be available.

According to a further exemplary embodiment, the angle of arrival is determined without using a time difference of arrival (TDoA) at the first antenna and at the second antenna, in particular regarding the first message and/or the second message. It may be determined based on measurements of solely the first phase difference and the second phase difference. This may be advantageous because time difference of arrival measurements may have considerable variance. They may not be precise enough to select a desired PDoA region when ambiguities occur. Therefore, large errors in determining the angle of arrival may result.

Alternatively, the angle of arrival may be determined by also taking into account the time difference of arrival at the first antenna and at the second antenna. Accordingly, the machine learning model may be trained on data including the time difference of arrival. This may for example be advantageous in challenging environments with antennas separated by less than half a wavelength.

According to a further exemplary embodiment, the communication device is one of a mobile device, a mobile phone, a transceiver, a circuit, a tag, a key, a token, a smart card.

According to a further exemplary embodiment, the further communication device is one of a mobile device, a mobile phone, a transceiver, a circuit, a tag, a key, a token, a smart card.

The aspects defined above and further aspects of the present disclosure are apparent from the examples of embodiment to be described hereinafter and are explained with reference to these examples of embodiment. The disclosure will be described in more detail hereinafter with reference to examples of embodiment but to which the disclosure is not limited.

BRIEF DESCRIPTION OF THE DRAWINGS

The illustrations in the drawings are schematic. In different drawings, similar or identical elements are provided with the same reference signs.

DESCRIPTION OF THE DRAWINGS

Before, referring to the drawings, exemplary embodiments will be described in further detail, some basic considerations will be summarized based on which exemplary embodiments of the present disclosure have been developed.

According to embodiments of the present disclosure, a method is described that exploits multiple channels for AoA estimation with antenna spacings d larger than half the wavelength ($>\lambda/2$) of the transmitted signals. More specifically, the method exploits the different phase behavior of two or more RF channels to resolve the PDoA ambiguities that appear when antenna spacings $d>\lambda/2$ are used for AoA estimation in AoA estimation systems with two or more antennas 102, 103. The ambiguity problem is a practical problem that can easily appear when building for example a UWB-equipped device such as a smartphone. To this end, a message exchange may be exploited with transmissions over at least two frequency channels with different carrier frequencies, e.g., channel 5 with $f_c \approx 6.5$ GHz and channel 9 with $f_c \approx 8$ GHz, presenting different phase behaviour that can be used in a combined manner to resolve the ambiguities and therefore accurately determine the AoA of the received signal.

Figure 1:
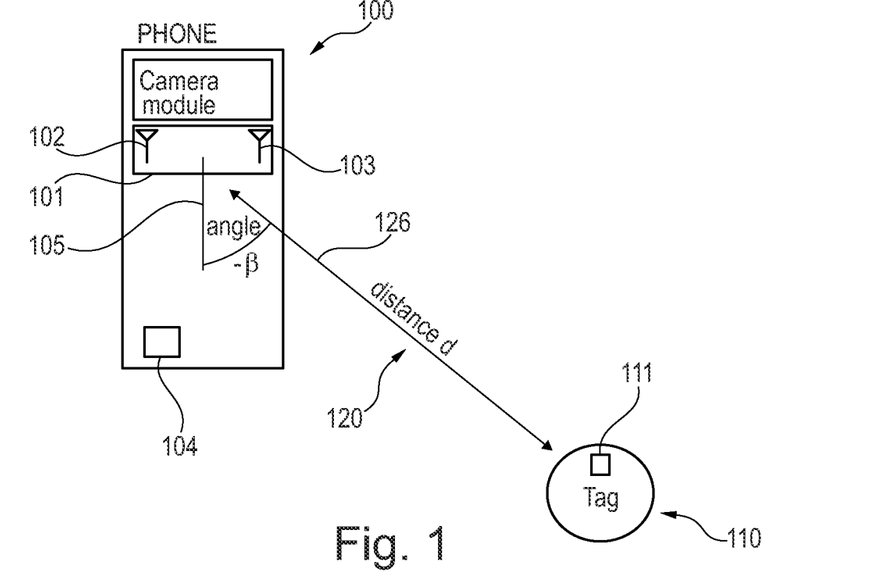
FIG. 1 illustrates a message exchange between a communication device and a further communication device according to an exemplary embodiment of the present disclosure.

FIG. 1 illustrates a message exchange 120 between a communication device 100 and a further communication device 110 according to an exemplary embodiment. The communication device 100 comprises a transceiver unit 101 comprising a first antenna 102 and a second antenna 103, wherein the transceiver unit 101 is configured to perform a message exchange 120 with the further communication device 110. The message exchange 120 comprises receiving at least one first message 321 associated with a first frequency at the communication device 100 by means of the first antenna 102 and the second antenna 103 and receiving at least one second message 324 associated with a second frequency at the communication device 100 by means of the first antenna 102 and the second antenna 103. The communication device 100 further comprises a processing unit 104 configured to determine an angle of arrival β defined by an orientation 105 of the communication device 100 and a transmission direction 126 of the message exchange 120, wherein the angle of arrival β is determined based on the received first message 321 and the received second message 324. The further communication device 110 comprises frequency circuitry 111 to provide a time source and to provide the first frequency and the second frequency.

FIG. 1 shows an example of an angle-of-arrival system consisting of a communication device 100, here a phone, and a further communication device 110, here a tag. The communication device 100 has two antennas 102, 103 that are spaced $\lambda/2$ or larger. The further communication device 110 is performing a distance measurement of distance d with the communication device 100. Based on a message exchange 120, the communication device 100 is able to measure the distance d as well as the incoming angle β of the corresponding signal (where the incoming angle is defined with an opposite sign in comparison to FIG. 2). This allows a user to determine how far the further communication device 110 is away from the communication device 100 as well as the direction the signal is coming from. Without using a message exchange 120 based on two frequencies, such as a dual-channel message exchange as shown and further explained in FIGS. 3 to 5 and 7 to 9, this would not be possible without a risk for substantial errors for a communication device 100 with such a big antenna spacing d.

Figure 2:
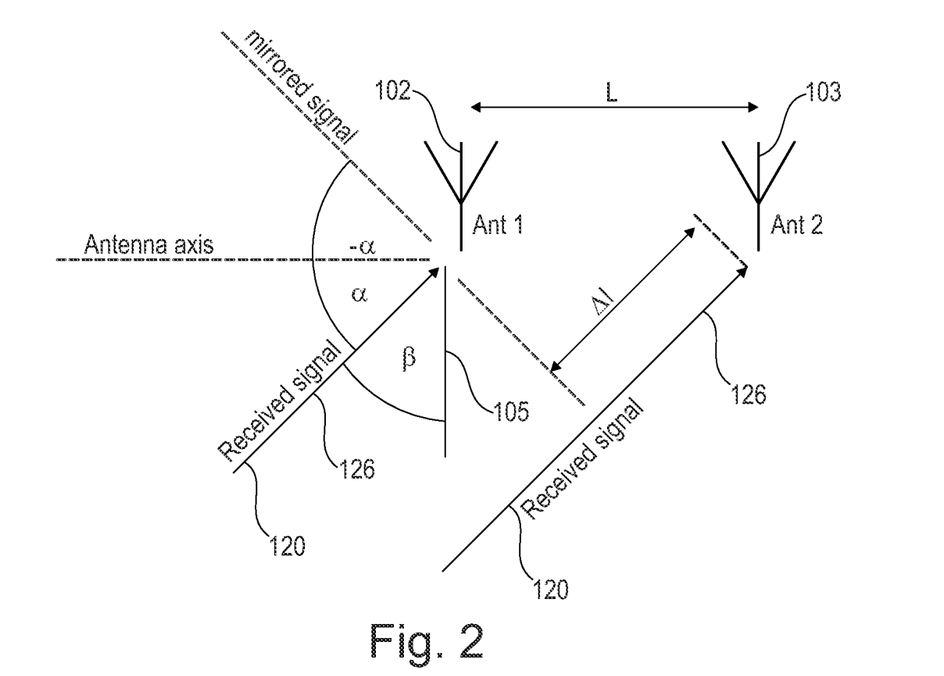
FIG. 2 illustrates a communication device with two antennas taking part in a message exchange according to an exemplary embodiment of the present disclosure.

FIG. 2 illustrates a communication device 100 with two antennas 102, 103 taking part in a message exchange 120 according to an exemplary embodiment of the present disclosure. It shows an example antenna design of a measurement system that consists of two receiving antennas 102, 103 that have a relative distance L between them. This distance L may be referred to as the antenna spacing. These two antennas 102, 103 receive a signal under angle β compared to the reference axis 105. The signal may be associated with a first message and/or a second message of a message exchange 120. A propagation direction of the signal corresponds to the transmission direction 126 of the message exchange 120.

Depending on the signal angle of arrival β, one antenna 102 receives the signal earlier than the other antenna 103. This leads to a signal propagation delay Δl that relates to the phase difference of arrival (PDoA) and the time difference of arrival (TDoA) of the received signal measured at the two antennas 102, 103. Because of frequency regulatory limitations, common UWB transceivers or other RF transceivers operate with a limited bandwidth, which in turn limits the achievable precision in TDoA estimates. This makes TDoA measurements not accurate enough to provide a good estimation of the signal angle of arrival β. However, the PDoA can be measured very accurately, yielding degree accurate AoA estimation.

The distance between the two antennas 102, 103 translates to a different propagation delay Δl that can be used to measure the angle of arrival β of the signal defined by the orientation 105 and the transmission direction 126. The relation between AoA β and PDoA based on the difference Δl in the signal propagation delay to the two antennas 102, 103 is as follows:

$$PDoA = 360° * \frac{\Delta l}{\lambda} = 360° * \frac{L * \sin(\beta) * f_c}{c}$$

Based on this relation, the angle of arrival can be determined from the PDoA, the carrier frequency $f_c$, the antenna spacing L and the propagation speed c:

$$\sin(\beta) = \frac{PDoA * c}{360° * L * f_c}$$

Unfortunately, since the measured PDoA ∈ [−180°, 180°], it is not always possible to find a unique solution for antenna spacings L larger than half the wavelength λ/2 of the carrier frequency $f_c$. However, such larger antenna spacings L would be beneficial for the placement of multiple UWB antennas 102, 103 in communication devices 100 with space constraints such as smartphones, where there are multiple restrictions coming from cameras, wireless charging, and other subsystems.

Figure 3:
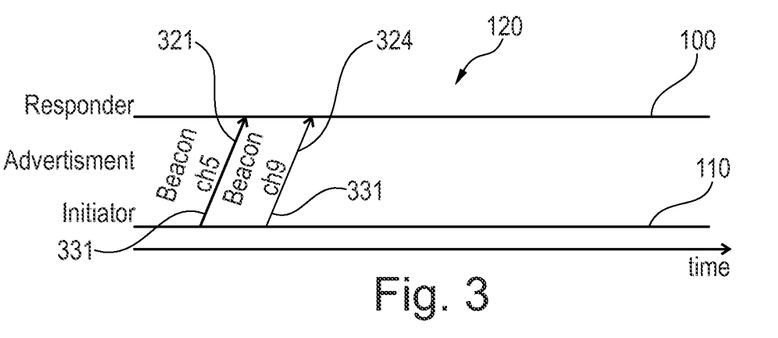
FIGS. 3 to 5 illustrate different message exchanges between a communication device and a further communication device according to exemplary embodiments of the present disclosure.
Figure 4:
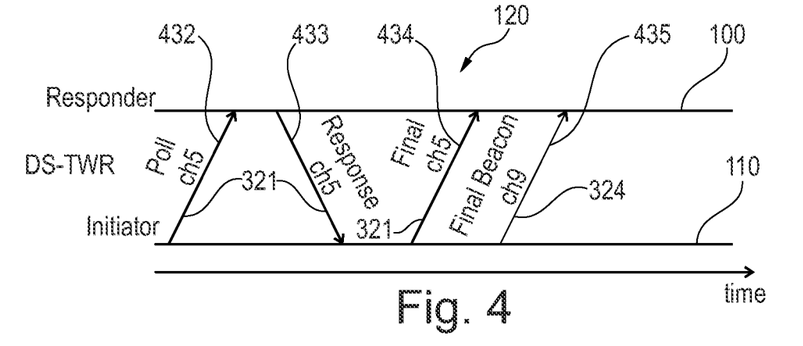
Figure 5:
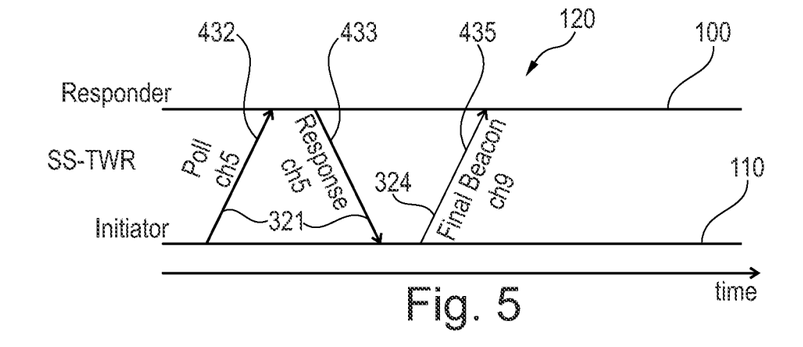

FIGS. 3 to 5 illustrate different message exchanges 120 between a communication device 100 and a further communication device 110 according to exemplary embodiments of the present disclosure. More exactly, these Figures illustrate different message exchange extensions of currently existing ranging protocols for achieving a low cost multi-channel based AoA measurement. To build the approach, a multi-channel message exchange 120 is employed from which the PDoA measurements over two or more RF channels can be obtained. How the actual message exchanges are extended is use case, system, and protocol dependent.

For an Advertisement/Beacon use case as shown in FIG. 3, the simplest solution is to send a combined set of advertisement beacons 331, e.g., one beacon 331 in channel 5, corresponding to a first message 321, followed by another beacon 331 in channel 9, corresponding to a second message 324. The beacons 331 are sent from an initiator corresponding to the further communication device 110 to a responder corresponding to the communication device 100.

In case of a DS-TWR message exchange 120 as shown in FIG. 4, where the responder, here the communication device 100, needs to be able to estimate the AoA, the initiator, here the further communication device 110, could send a final beacon 435 on channel 9, corresponding to a second message 324, on top of the other channel 5 messages, i.e. the poll message 432, the response message 433, and the final message 434, corresponding to a plurality of first messages 321.

The SS-TWR message exchange 120 as shown in FIG. 5 is extended in a similar fashion as the DS-TWR message exchange of FIG. 4, namely by adding a final beacon 435 as second message 324 after the plurality of first messages 321 consisting of a poll message 432 followed by a response message 433.

Referring again to all FIGS. 3 to 5, a message exchange 120 could be extended either with a final beacon 435 or by transmitting a specific message of the message exchange 120 on a different channel such as channel 9, which would reduce the number of messages sent and therefore the channel utilization. The same message reduction would occur for example, if a pre-poll message, i.e. the very first message, or a final data message is transmitted on a different channel such as channel 9. The different channel 9 messages correspond to second messages 324. Furthermore, if the protocol shall serve more than two channels the final channel 9 message corresponding to a second message 324 can be extended by one or multiple messages on the different channels that should be included in the measurement.

A reasoning for not integrating the channel switching in the already existing message exchange may be not to lose a common time basis during the ranging. For example, if for the SS-TWR message exchange of FIG. 5, the poll message 432 would be transmitted on channel 9 but the response message 433 on channel 5, between the two messages transmissions the channel needs to be changed. This means the radio frequency phase-locked loop (RF-PLL) that is responsible for creating the carrier frequency typically needs to change its frequency. There could be PLL architectures that instead of changing the frequency change a frequency divider value. During such a frequency change there is no accurate time source available in the system if the other device clocks are derived from the RF-PLL. This loss of an accurate time source would mean the ranging performance decreases drastically.

The distance d is a function of the roundtrip time $T_{round}$ and the reply time $T_{reply}$ as well as the propagation speed c:

$$d = \frac{T_{round} - T_{reply}}{2} * c$$

The roundtrip time $T_{round}$ is measured on the initiator side, i.e. on the side of the further communication device 110, and the reply time $T_{reply}$ is measured on the responder side, i.e. the communication device 100. If one of these times is off by 1 nanosecond, this would result in a distance measurement error of roughly 15 cm. Since the UWB technology is used for accurate distance measurements with a preferred maximum error <10 cm, already a small offset in the time basis would lead to huge errors meaning one of the key features of the technology is not working anymore. Due to that reason, a multi-channel ranging may not be possible because of the impact on the distance measurement accuracy in case a single PLL system is used.

Figure 6:
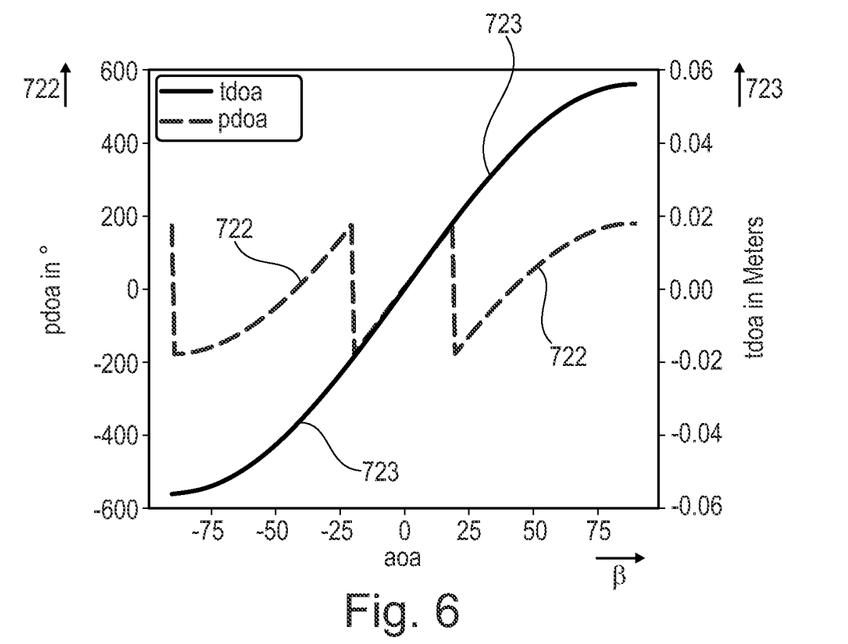
FIG. 6 illustrates ambiguities regarding an angle of arrival arising from a method according to an exemplary embodiment of the present disclosure.

FIG. 6 illustrates ambiguities regarding an angle of arrival β arising from a method according to an exemplary embodiment. It shows the ideal PDoA 722 and TDoA 723 curves as a function of the angle of arrival β assuming an antenna spacing L of 1.5 wavelengths (1.5λ). For AoA β=0°, the PDoA 722 can have three potential values, approximately κ°, −50°, and +50°, which can lead to large AoA estimation errors in the order of 50°, unacceptable for most systems relying on AoA estimation. It has been suggested that differences in the reception timestamps at the two antennas, i.e. TDoA 723, could be used to resolve these ambiguities. However, due to the limited bandwidth of real-world UWB systems or other RF systems, these TDoA measurements exhibit a large variance that would lead to large AoA estimation errors.

Figure 7:
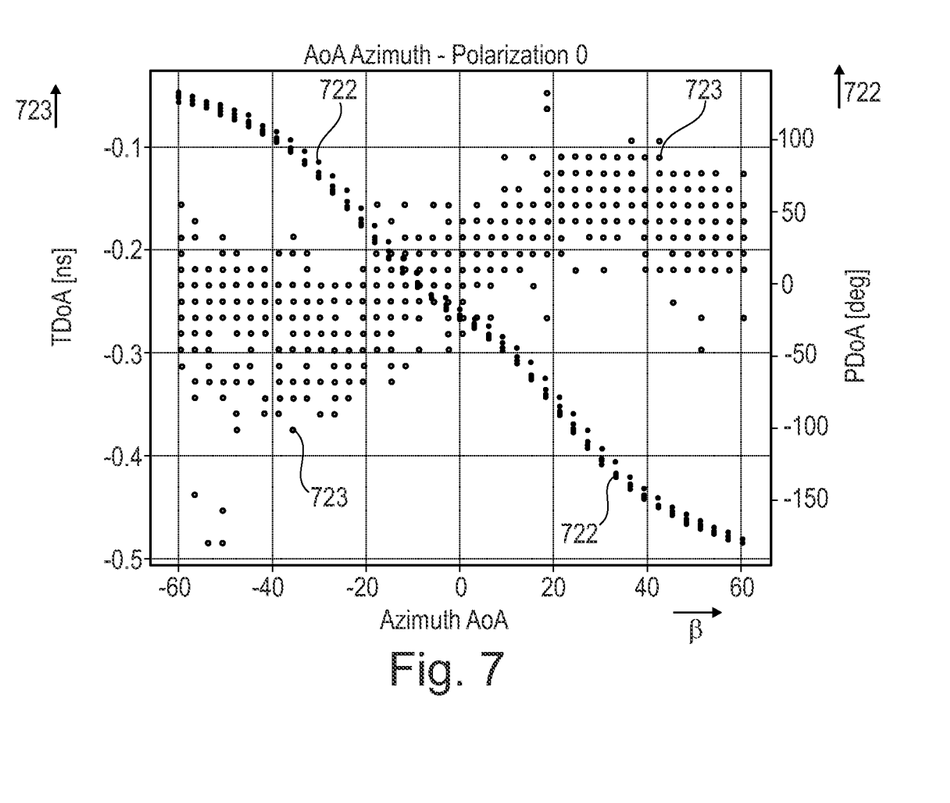
FIG. 7 illustrates variance in PDoA and TDoA measurements when using a method according to an exemplary embodiment of the present disclosure.

FIG. 7 illustrates variance in PDoA and TDoA measurements when using a method according to an exemplary embodiment. TDoA measurements 723 and PDoA measurements 722 versus the azimuth of the angle of arrival β are shown. The TDoA and PDoA values are measured in a platform with two antennas separated d=λ/2. As shown, TDoA measurements 723 present a large variance that makes them unsuitable for AoA estimation, in particular for resolving ambiguities in the case of antenna spacing d larger than λ/2. While further increase in antenna spacing d can lower the precision requirements of TDoA for AoA estimation, they also increase the ambiguities in PDoA. Using TDoA values for resolving ambiguities results in an inconvenient and imprecise technique for AoA estimation with antenna spacings d larger than λ/2.

Figure 8:
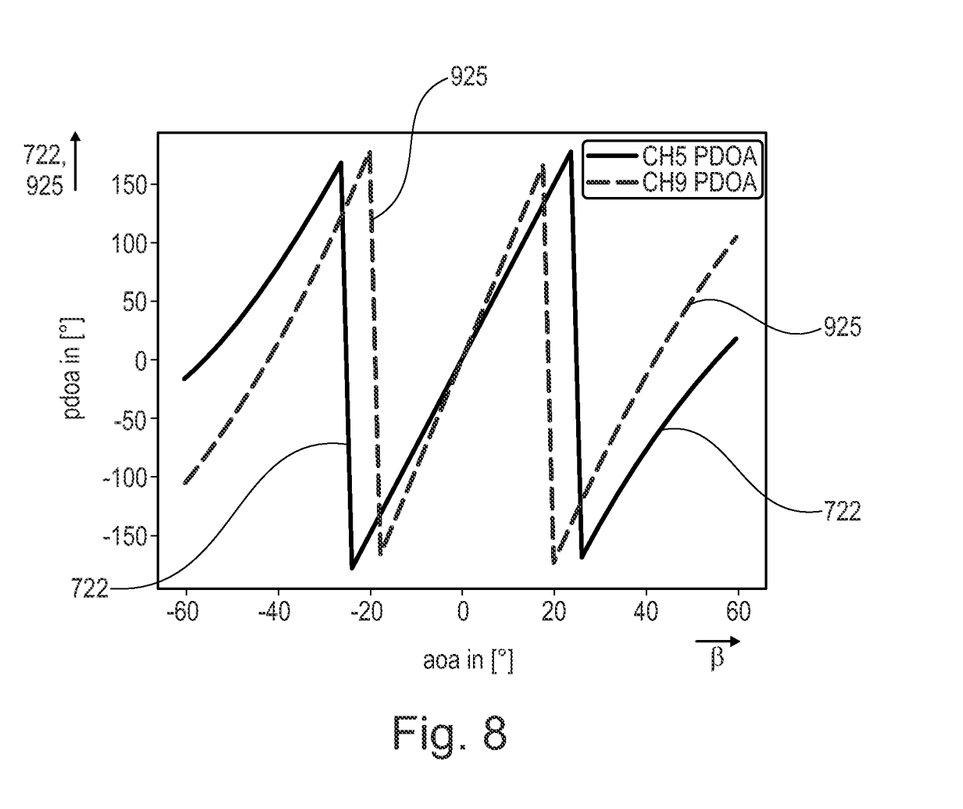
FIG. 8 illustrates ambiguities using different frequency channels arising from a method according to an exemplary embodiment of the present disclosure.

FIG. 8 illustrates ambiguities using different frequency channels arising from a method according to an exemplary embodiment. PDoA curves 722, 925 of two different frequency channels, here channels 5 and 9, are shown for different angles of arrival β using two antennas separated by one channel 5 wavelength.

FIG. 8 shows the phase behaviour differences of two or more frequency channels with a simulation of a multi-channel based PDoA measurement. It is shown that the PDoA curves 722, 925 present significant differences in their behaviour, especially in the regions with ambiguities and therefore of uncertainty regarding AoA β estimation. For instance, the curve 925 for channel 9 presents abrupt changes (vertical jumps) at β≈±20°. By contrast, the curve 722 for channel 5 shows a more linear behaviour, without these abrupt changes, in the same regions. These differences in the PDoA curves 722, 925 are exploited to resolve the ambiguities in AoA estimation.

To further illustrate the differences of the two curves 722, 925 and how they can be used, let us assume that a UWB device or other RF device receives a signal coming from angle AoA of β=0°. In this case, the PDoA curve 925 for channel 9 and also the PDoA curve 722 for channel 5 show a PDoA value of ~0°. However, for channel 9 a PDoA value of ~0° can also be found for AoA values of β=+40° and −40°. Differently, for channel 5, the AoA values that match PDoA=0 are approximately β=0°, +50°, −50°. This means that using one channel alone, the true AoA value cannot be distinguished from the other two potential values based on the respective PDoA curve. However, if the PDoA values of both channels are used as well as previous knowledge of their phase behaviour, the only common solution of β=0° can be determined, which indeed is the correct AoA. The combination of two or more channels with their different phase behaviour together with the low variance of PDoA estimates with multi-receiver UWB allows for accurate determination of angles of arrival β.

In general, the AoA β is estimated as a function f of PDoA values 722, 925 over two RF channels:

$$AoA=f(PDoA_{CH5}, PDoA_{CH9})$$

Depending on the antenna system it might make sense to use the phase measurements of more than two channels, which would result in an AoA β estimation as a function f of PDoA values over N frequency channels:

$$AoA=f(PDoA_{CH1}, PDoA_{CH2}, \ldots, PDoA_{CH\ N})$$

Thus, PDoA curves 722, 925 are used, where the ambiguities lie in different regions. This phenomenon together with the much lower variance of PDoA estimates, e.g. compared with TDoA estimates (see FIG. 7), facilitates accurate AoA estimation with antenna spacings d>λ/2. Depending on the antenna system, PDoA estimates from multiple antenna pairs in a given channel could be used.

Figure 9:
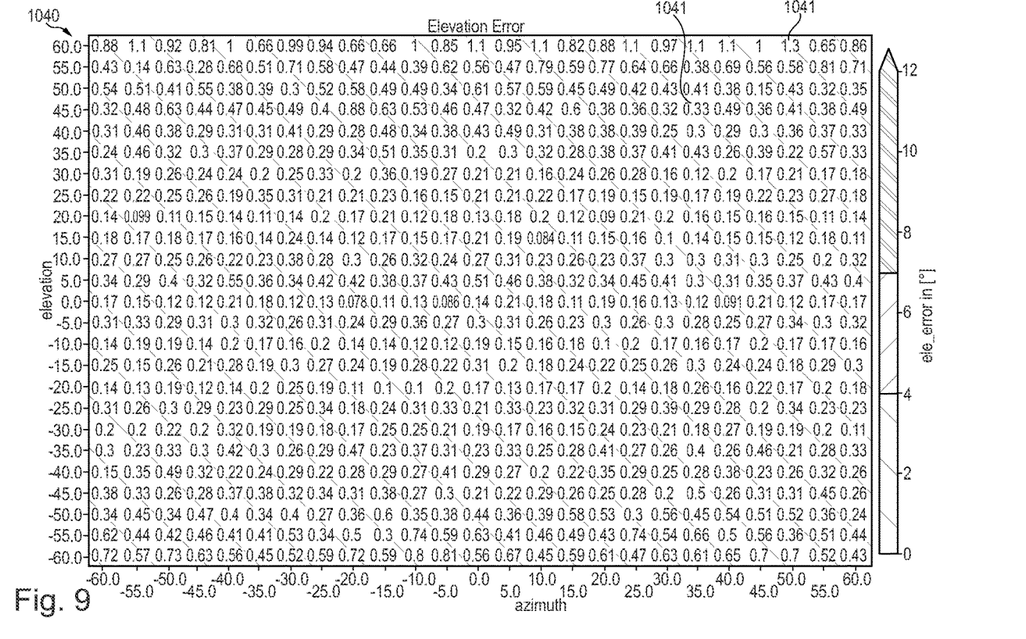
FIG. 9 illustrates an error matrix when determining an angle of arrival according to an exemplary embodiment of the present disclosure.

FIG. 9 illustrates an error matrix 1040 when determining an angle of arrival β according to an exemplary embodiment of the present disclosure. Angle-dependent errors 1041 are shown depending on the azimuth (x-axis) and the elevation (y-axis) of the angle of arrival β. Using a multi-channel AoA estimation approach, the PDoA ambiguities can be resolved and AoA can be estimated very accurately.

The actual manner in which the PDoA values are combined is implementation dependent and can vary depending on the use case and the computational power available in the measurement system. One potential method for creating such a function is using a Machine Learning (ML) model, e.g., a neural network whose input features are the raw PDoA values over multiple channels or the sin/cos function of the raw PDoA values. FIG. 9 shows the AoA estimation accuracy in terms of angle-dependent errors 1041 using such a machine learning approach with dual-channel measurements, here a machine learning model after training with PDoA curves from channels 5 and 9. Using a single channel, the average error is about 30°, using a multi-channel approach the average error decreased to less than 0.5° as shown in FIG. 9.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS 100 communication device
101 transceiver unit
102 first antenna
103 second antenna
104 processing unit
105 orientation of communication device 110 further communication device
111 frequency circuitry
120 message exchange
121 transmission direction
321 first message
324 second message
331 beacon message
432 poll message
433 response message
434 final message
435 final beacon message
722 phase difference of arrival (first message)
723 time difference of arrival (first message)
925 phase difference of arrival (second message)
1040 error matrix
1041 angle-dependent error
d distance between communication device and further communication device
β angle of arrival
L distance between first antenna and second antenna
Δl propagation delay

The invention claimed is:

1. A method for determining an angle of arrival at a communication device, the method comprising:
performing a message exchange between the communication device and a further communication device, wherein the message exchange comprises receiving at least one first message associated with a first frequency at a first antenna and a second antenna of the communication device, and receiving at least one second message associated with a second frequency at the first antenna and the second antenna, wherein the message exchange comprises a standardized ranging message exchange, and wherein the message exchange comprises changing a frequency of the standardized ranging message exchange, which corresponds to the first frequency, to the second frequency; and
determining the angle of arrival defined by an orientation of the communication device and a transmission direction of the message exchange, wherein the angle of arrival is determined based on the received at least one first message and the received at least one second message.

2. The method of claim 1, wherein the angle of arrival is determined based on a first phase difference resulting when the at least one first message is received by the first antenna and the second antenna and on a second phase difference resulting when the at least one second message is received by the first antenna and the second antenna.

3. The method of claim 1, wherein a distance between the first antenna and the second antenna is at least half a first wavelength corresponding to the first frequency and at least half a second wavelength corresponding to the second frequency.

4. The method of claim 1, wherein the first frequency is associated with a first frequency channel and the second frequency is associated with a second frequency channel different from the first frequency channel.

5. The method of claim 4, wherein the first message is transmitted over the first frequency channel and the second message is transmitted over the second frequency channel.

6. The method of claim 5, wherein the first frequency channel and the second frequency channel are ultra-wide band (UWB) frequency channels.

7. The method of claim 6, wherein a third frequency channel is between the first frequency channel and the second frequency channel.

8. The method of claim 1, wherein the at least one second message is received after or before the at least one first message.

9. The method of claim 8, further comprising determining a distance between the communication device and the further communication device based on the at least one first message.

10. The method of claim 9, wherein frequency circuitry of the further communication device is configured for providing a time source and for providing at least one of the first frequency and the second frequency.

11. The method of claim 10, wherein the frequency circuitry is a phase-locked loop.

12. The method of claim 1, wherein the standardized ranging message exchange is one of an advertisement message exchange, a double-sided two-way ranging (DS-TWR) message exchange, a single-sided two-way ranging (SS-TWR) message exchange, and or a fine ranging (FiRa) DS-TWR message exchange.

13. The method of claim 1, wherein the at least one second message is separate from the standardized ranging message exchange.

14. The method of claim 1, wherein the frequency associated with a standardized message of the standardized ranging message exchange is changed from the first frequency to the second frequency such that the standardized message forms the at least one second message.

15. The method of claim 1, wherein the at least one second message comprises one of a beacon message, a final beacon message, an initial beacon message, a prepoll message, or a final data message.

16. The method of claim 1, wherein the angle of arrival is determined using a machine learning model, which is adapted to the first antenna and the second antenna.

17. The method of claim 16, wherein the machine learning model is built based on training data correlating measured phase differences with measured angles.

18. The method of claim 1, wherein the angle of arrival is determined without using a time difference of arrival at the first antenna and at the second antenna.

19. A communication device comprising:
a transceiver unit comprising a first antenna and a second antenna, wherein the transceiver unit is configured to perform a message exchange between the communication device and a further communication device, wherein the message exchange comprises receiving at least one first message associated with a first frequency at the communication device at the first antenna and the second antenna, and receiving at least one second message associated with a second frequency at the communication device at the first antenna and the second antenna, wherein the message exchange comprises a standardized ranging message exchange, and wherein the message exchange comprises changing a frequency of the standardized ranging message exchange, which corresponds to the first frequency, to the second frequency; and
a processing unit configured to determine an angle of arrival defined by an orientation of the communication device and a transmission direction of the message exchange,
wherein the angle of arrival is determined based on the received at least one first message and the received at least one second message.

* * * * *